C. R. BANDLE.
PISTON.
APPLICATION FILED AUG. 27, 1919.
1,377,453.
Patented May 10, 1921.
2 SHEETS—SHEET 1.
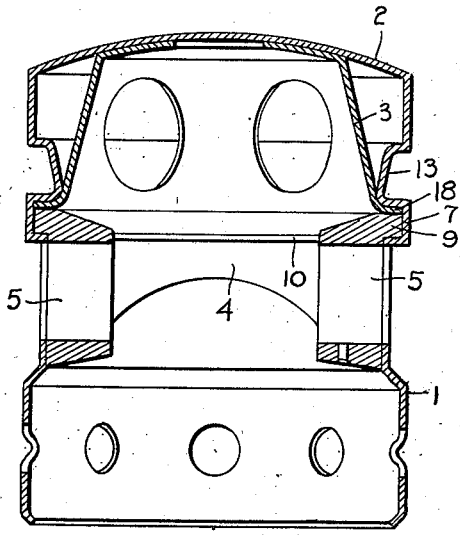
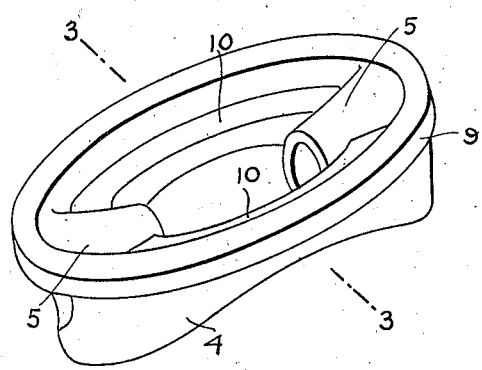
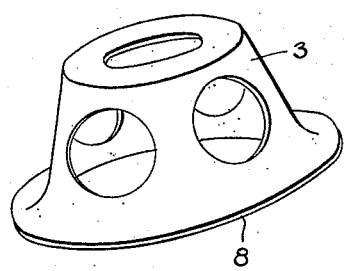
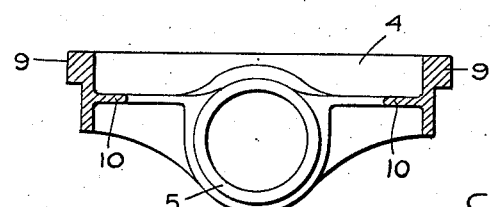
WITNESSES
INVENTOR
Chester R. Bandle
BY
ATTORNEYS

C. R. BANDLE.
PISTON.
APPLICATION FILED AUG. 27, 1919.

1,377,453.

Patented May 10, 1921.
2 SHEETS—SHEET 2.

WITNESSES
A. Fritznagel
S. W. Foster

INVENTOR
Chester R. Bandle
BY
ATTORNEYS

UNITED STATES PATENT OFFICE.

CHESTER R. BANDLE, OF LOS ANGELES, CALIFORNIA.

PISTON.

1,377,453.    Specification of Letters Patent.    Patented May 10, 1921.

Application filed August 27, 1919. Serial No. 320,092.

*To all whom it may concern:*

Be it known that I, CHESTER R. BANDLE, a citizen of the United States, and a resident of Los Angeles, in the county of Los Angeles and State of California, have invented a new and Improved Piston, of which the following is a full, clear, and exact description.

This invention relates to improvements in pistons, and more particularly to a sheet metal piston for internal combustion engines having an improved construction and mounting for the piston pin bosses, an object of the invention being to so connect the piston pin bosses with the piston that a plurality of bearing surfaces is provided which insures the maintenance of the bosses in their proper relative position notwithstanding the shocks and vibrations to which they are necessarily subjected.

A further object is to provide a sheet metal piston having cast metal bosses with flange and groove connection and also provide within the piston a piston head supporting brace with its base portion located against the piston pin bosses, whereby a maximum of strength and union of parts is insured.

A further object is to provide a piston construction which will be extremely light, which will be of maximum strength and durability, and which can be manufactured and sold at a reasonably low price.

With these and other objects in view the invention consists in certain novel features of construction, and combinations and arrangements of parts, as will be more fully hereinafter described and pointed out in the claims.

In the accompanying drawings—

Figure 1 is a view in longitudinal section illustrating the preferred form of my invention;

Fig. 2 is a perspective view of the casting 4 which has integral piston pin bosses;

Fig. 3 is a view in transverse section on the line 3—3 of Fig. 2;

Fig. 4 is a perspective view of the piston head supporting brace;

Figure 5:
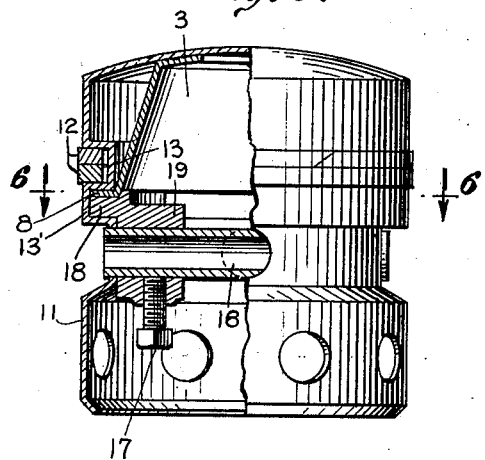
Fig. 5 is a view partly in elevation and partly in longitudinal section illustrating a modification.

Referring particularly to Figs. 1, 2, 3 and 4, 1 represents a piston or shell which is of sheet metal having an integral head 2 at one end and a head supporting brace 3 within the piston, bearing at its outer end against the inner face of the head 2 and secured within the piston, as will be hereinafter explained. 4 represents a casting which is of circular form fitting within the intermediate portion of the piston 1 and having a pair of alined piston pin bosses 5, and a strengthening web 10.

The piston is provided with an annular internal groove 7, which receives in its upper portion the base flange 8 of brace 3, and in its lower portion the said groove receives an annular flange 9 on casting 4, the combined thicknesses of the flanges 8 and 9 being such as to snugly fill the groove. This construction affords a plurality of bearing surfaces whereby the piston pin bosses are securely held against all thrusts.

The piston may be provided with any number of annular grooves 13 to receive piston rings therein, and said grooves are formed by forcing inwardly the metal of the shell, as clearly shown in Fig. 1. The piston head supporting brace 3 is preferably of sheet metal and perforated for lightness, as shown, and can be stamped or otherwise formed in manufacture.

Figure 6:
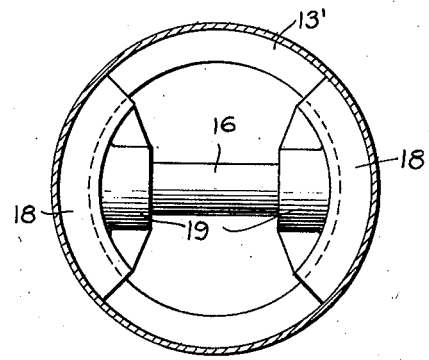
Fig. 6 is a view in transverse section on the line 6—6 of Fig. 5.
Figure 7:
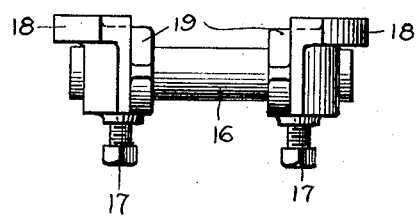
Fig. 7 is a view in elevation of the piston pin and bosses shown in Fig. 5.

In the modification illustrated in Figs. 5, 6 and 7, a slightly different shape of piston is shown and for this reason I have given this piston the reference numeral 11.

The piston 11 is made with an annular groove 13 receiving piston rings 12, and below the groove 13 the piston is provided with an internal annular groove 13′ which receives therein the base flange 8 of brace 3 and also receives the curved flanges 18 of the piston pin bosses 19. The piston pin bosses 19 of this modification are separate members which are secured by set screws 17 with the piston pin 18, hence the piston pin and bosses constitute a single member when securely clamped together, as shown clearly in Fig. 3. This type of construction provides a means whereby the piston pin bosses can be moved within the piston to change the relative position of the bosses with the shell or casing of the piston and hence maintain the life of the piston by reason of changing the position of the surfaces which are most subjected to wear. This type of construction is also particularly adaptable to pistons made by casting, said pistons being machined both externally and internally to proper shape thereby securing the minimum thickness of piston wall and consequent lightness in weight.

The device operates as the preferred form with the exception that the flanges 18 are not annular as is the flange 9 of the preferred form, but they are of a sufficient segment to insure a strong and durable bearing within the groove of the piston.

Figure 8:
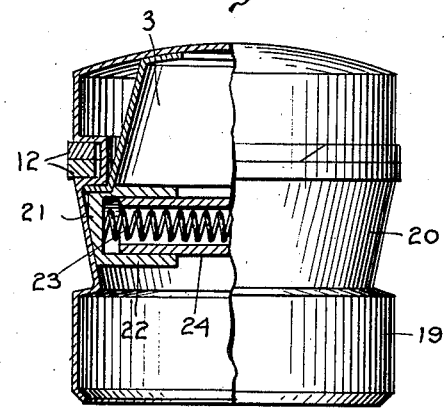
Fig. 8 is a view similar to Fig. 5 illustrating another modification.

In the modification illustrated in Fig. 8, the piston 19 is made with a conical intermediate portion 20 receiving the bearing ends 21 of the bosses 22 thereagainst, and the piston pin 24 is located in the bosses with a coiled spring 23 holding the parts in normal position. In this modification, Fig. 8, a head supporting brace 3 is also provided which bears at its inner end against the bosses.

In all of the different forms of my invention, it will be noted that the piston pin bosses have ample bearing surfaces within the piston and the head supporting braces also have ample bearing surfaces so as to insure the maximum strength.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. A device of the character described comprising a piston, a casting located within the piston having piston-pin bosses thereon, and a piston-head supporting brace located in the piston and engaging said casting.

2. A device of the character described comprising a piston, a casting in the piston, integral piston-pin bosses in the casting, and an annular internal web in the casting strengthening said bosses.

3. A device of the character described, comprising a casing having an internal groove, a pair of piston pin bosses, flanges on the bosses located in the groove, and a piston head supporting brace bearing against the said flanges.

4. A device of the character described, comprising a sheet metal piston, a pair of piston pin bosses having bearing surfaces therein, and a piston head supporting brace having bearing surfaces in the piston.

5. A device of the character described, comprising a sheet metal piston having an internal annular groove, a casting having alined piston pin bosses therein, an annular flange on the casting located in the said groove, a piston head supporting brace, and an annular base flange on the brace located in the groove between the flange and the wall of the groove.

6. A device of the character described, comprising a sheet metal piston having internal and external grooves, piston rings in the external grooves, piston pin bosses supported in the internal groove, and a piston head supporting brace located between the bosses and the head of the piston.

CHESTER R. BANDLE.